United States Patent [19]

Nogami

[11] 4,254,997
[45] Mar. 10, 1981

[54] FLUID PRESSURE CONTROL DEVICE FOR VEHICLE BRAKING SYSTEMS

[75] Inventor: Tomoyuki Nogami, Toyota, Japan

[73] Assignee: Toyota Jidosha Kogyo Kabushiki Kaisha, Toyota, Japan

[21] Appl. No.: 96,318

[22] Filed: Nov. 21, 1979

[30] Foreign Application Priority Data

Nov. 28, 1978 [JP] Japan ................ 53-146827

[51] Int. Cl.³ .................................. B60T 8/14
[52] U.S. Cl. ................ 303/6 C; 188/349; 303/24 C; 303/24 F
[58] Field of Search ........... 303/24 A, 24 F, 24 C, 303/6 C; 188/349

[56] References Cited

U.S. PATENT DOCUMENTS

| | | | |
|---|---|---|---|
| 2,218,194 | 10/1940 | Freeman | 188/152 |
| 4,072,363 | 2/1978 | Tomoyuki | 303/24 C |
| 4,116,493 | 9/1978 | Hayashida | 303/24 A |
| 4,181,370 | 1/1980 | Noeami et al. | 303/24 C X |

FOREIGN PATENT DOCUMENTS

| | | |
|---|---|---|
| 2340229 | 9/1977 | France . |
| 1211201 | 11/1970 | United Kingdom . |
| 2003240 | 3/1979 | United Kingdom . |
| 2022735 | 12/1979 | United Kingdom . |

*Primary Examiner*—Douglas C. Butler
*Attorney, Agent, or Firm*—Oblon, Fisher, Spivak, McClelland & Maier

[57] ABSTRACT

A fluid pressure control device for incorporation in a vehicle braking system between a master cylinder and a wheel brake cylinder which includes a housing provided with an inlet port for connection to the master cylinder, an outlet port for connection to the wheel brake cylinder, and a valve chamber communicating at one end thereof with the inlet port and at the other end thereof with the outlet port, an inertia-controlled valve including a valve seat provided in the valve chamber to permit the flow of fluid between the inlet and outlet ports therethrough, and an inertia-controlled valve element housed within the valve chamber to cooperate with the valve seat to cut off the flow of fluid from the inlet port to the outlet port when the valve element is subjected to a deceleration in excess of a predetermined value, a bypass passage for permitting direct fluid flow from the valve chamber into the outlet port, a check valve including a valve seat provided within the bypass passage and a valve member cooperating with the second valve seat, the check valve being biased open for allowing direct flow of fluid from the valve chamber to the outlet port until the pressure acting on the piston reaches a predetermined value.

4 Claims, 2 Drawing Figures

4,254,997

FLUID PRESSURE CONTROL DEVICE FOR VEHICLE BRAKING SYSTEMS

BACKGROUND OF THE INVENTION

The present invention relates to fluid pressure control devices for vehicle braking systems, and more particularly to an improved fluid pressure control device of the type which comprises an inertia-controlled cut-off valve for interrupting fluid communication between a master cylinder and rear wheel brake cylinders at a deceleration in excess of a predetermined value.

SUMMARY OF THE INVENTION

The primary object of the present invention is to provide an improved fluid pressure control device capable of facilitating air-purge from the interior of the control device when brake fluid is being charged into the vehicle braking system and stabilizing closure timing of the inertia-controlled cut-off valve.

Another object of the present invention is to provide an improved fluid pressure control device wherein even if the inertia-controlled cut-off valve is erroneously closed, the wheel cylinder pressure can be controlled to conduct the effective braking operation.

According to the present invention there is provided a fluid pressure control device for incorporation in a vehicle braking system between a master cylinder and a wheel brake cylinder, the control device including
a housing provided with an inlet port for connection to the master cylinder, an outlet port for connection to the wheel brake cylinder, and a valve chamber communicating at one end thereof with the inlet port and at the other end thereof with the outlet port;
inertia-controlled valve means including a valve seat provided in the valve chamber to permit the flow of fluid between the inlet and outlet ports therethrough, and an inertia-controlled valve element housed within the valve chamber to co-operate with the valve seat to cut off the flow of fluid from the inlet port to the outlet port when the valve element is subjected to a deceleration in excess of a predetermined value;
a bypass passage to permit direct fluid flow from the vave chamber into the outlet port;
check valve means including a valve seat provided within the bypass passage and a valve member co-operating with the second-named valve seat, the valve member being biased to close the check valve means for interrupting the direct flow of fluid from the valve chamber to the outlet port; and
a piston axially slidable within a bore extending coaxially with the bypass passage and being exposed at one end thereof in the bypass passage, the piston being engageable with the valve member of the check valve means and being biased to open the check valve means for allowing the direct flow of fluid from the valve chamber to the outlet port until the fluid pressure acting on the piston reaches a predetermined value.

Preferably, the bypass passage is communicated with the upper part of the valve chamber to permit bleeding air from the upper part of the valve chamber when brake fluid is being charged into the braking system. It is also noted that the piston is arranged to be retracted by the fluid pressure acting thereon prior to closing of the inertia-controlled valve means to close the check valve means.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
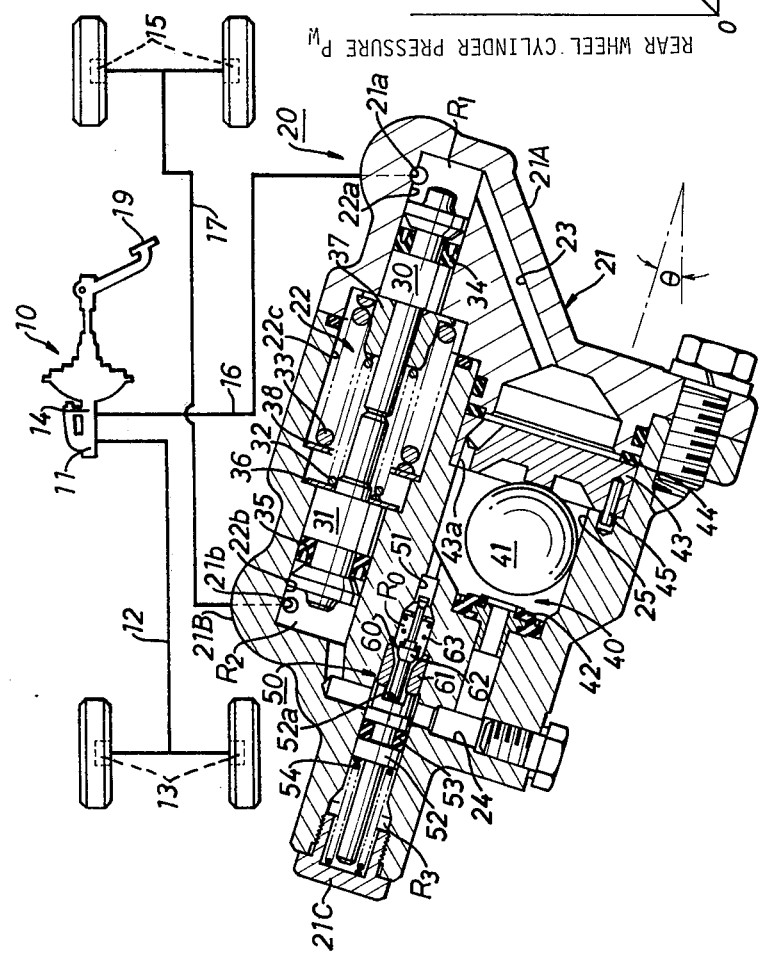
FIG. 1 illustrates a vehicle braking system including a fluid pressure control device in accordance with the present invention.

Referring now to the drawings, particularly in FIG. 1 there is illustrated a conventional tandem master cylinder 10 which is operated by depression of a foot brake pedal 19. The master cylinder 10 is provided with a front pressure chamber 11 connected to front wheel brake cylinders 13 by way of a conduit 12 and a rear pressure chamber 14 connected to rear wheel brake cylinders 15 by way of conduits 16 and 17. Interposed between the conduits 16 and 17 is a fluid pressure control device 20 in accordance with the present invention.

The control device 20 is fixedly mounted to the vehicle body structure at an inclined angle $\theta$ relative to the horizontal and comprises a housing assembly 21 which is provided therein with a small diameter piston 30, a large diameter piston 31 and an inertia-controlled valve element 41 in the form of a steel ball. The housing assembly 21 includes a rear housing 21A provided thereon with an inlet port 21a and a front housing 21B provided thereon with an outlet port 21b. The inlet port 21a is connected to the rear pressure chamber 14 of master cylinder 10 by way of conduit 16. The outlet port 21b is connected to the rear wheel brake cylinders 15 by way of conduit 17. Within the housing assembly 21, there are provided in parallel a stepped cylindrical bore 22 and a valve chamber 25 in the form of an inner stepped bore. The stepped cylindrical bore 22 includes a small diameter portion 22a into which the inlet port 21a opens, a large diameter portion 22b into which the outlet port 21b opens, and an intermediate portion 22c in which coil spring 32 and 33 are concentrically assembled. The valve chamber 25 communicates at opposite ends thereof with the small and large diameter portions 22a and 22b of stepped cylindrical bore 22 by way of first and second passages 23 and 24 respectively. The second passage 24 is also connected to the top of valve chamber 25 through a bypass passage 51, in which a check valve assembly 60 is provided to open the bypass passage 51 at the initial stage of braking operation, as described in detail later.

The small diameter piston 30 is reciprocably engaged within the small diameter portion 22a of stepped bore 22 via an annular seal member 34 to form a first fluid chamber $R_1$ into which the inlet port 21a opens directly. The first fluid chamber $R_1$ is connected to the valve chamber 25 by way of first passage 23. The large diameter piston 31 is reciprocably engaged within the large diameter portion 22b of stepped bore 22 via an annular seal member 35 to form a second fluid chamber $R_2$ into which the outlet port 21b opens directly. The second fluid chamber $R_2$ is connected to the valve chamber 25 by way of second passage 24, and the large diameter piston 31 is provided with an extended portion which is in engagement with an extended portion of the small diameter piston 30.

The small diameter coil spring 32 surrounds the extended portions of both pistons 30, 31 and is engaged at one end thereof with an annular retainer 36 and at the other end thereof with a sleeve-like retainer 37. The annular retainer 36 is detachably engaged with a stepped portion of front housing 21B and an inner shoulder of large diameter piston 31, while the sleeve-like retainer 37 is also detachably engaged with an inner end face of rear housing 21A and an inner shoulder of small diameter piston 30. Thus, the coil spring 32 is compressed with a predetermined load to restrict movement of the piston 31 toward the first fluid chamber $R_1$ and to restrict movement of the piston 30 toward the second fluid chamber $R_2$. The large diameter coil spring 33 is concentrically assembled with the small diameter coil spring 32 and is engaged at one end thereof with a stepped portion of front housing 21B through an annular retainer 38 and at the other end thereof with an annular flange of sleeve-like retainer 37. Thus, the coil spring 33 is compressed with a predetermined load to restrict movement of the piston 30 toward the second fluid chamber $R_2$.

The inertia-controlled ball 41 located within valve chamber 25 is free to roll forwardly up the inclined bottom of valve chamber 25 and co-operates with an annular valve seat 42 secured to the side wall of valve chamber 25 to provide a cut-off valve 40. The ball 41 normally rests under gravity in the position shown in the drawing and is received by the central boss of a partition plate 43. The partition plate 43 is snugly engaged within the large diameter portion of inner stepped bore 25 to subdivide the valve chamber into two chambers. The partition plate 43 is also engaged at its back face with an annular protrusion of rear housing 21A through an annular seal member 44 in such a manner that it is fixed in place due to resilient abutment against an inner shoulder of bore 25. The partition plate 43 is further provided at its upper portion with a fluid passage 43a to provide a fluid communication between the two chambers. A knock-pin 45 is fixed to the bottom portion of partition plate 43 and inserted into the inner shoulder of bore 25, so as to prevent undesirable rotation of the partition plate 43. In braking operation, when the rate of deceleration caused by the application of the brakes exceeds a predetermined value, the ball 41 will roll forwardly due to the inertia force acting thereon toward the valve seat 42 so that the cut-off valve 40 is closed to interrupt fluid flow from the first fluid chamber $R_1$ to the second fluid chamber $R_2$.

The check valve assembly 60 comprises a valve seat 61 fixedly provided within the bypass passage 51 and a valve member 62 co-operating with the valve seat 61. The valve member 62 is biased toward the valve seat 61 by a compression coil spring 63 to close the check valve 60 for interrupting direct fluid flow from the valve chamber 25 to the outlet port 21b. A piston 52 is axially slidable within a bore extending coaxially with the bypass passage 51 via an annular seal member 53, which piston 52 forms at one side thereof a fluid chamber $R_0$ in bypass passage 51 and at the other side thereof a space $R_3$ closed by a screw plug 21C. The piston 52 is exposed at the inner end thereof in the second passage 24 between valve seat 42 and outlet port 21b and is provided at the inner end thereof with a recess 52a which receives therein a leg of valve member 62. The screw plug 21C is threaded into the front housing 21B and receives a coil spring 54 which is engaged at one end thereof with the outer end of piston 52 and at the other end thereof with the screw plug 21C. Thus, the coil spring 54 is compressed with a predetermined load to bias the piston 52 toward the valve member 62, the resilient force of coil spring 54 being larger than that of coil spring 63 to normally open the check valve 60 by engagement of the valve member 62 with the piston 52 for allowing the direct flow of fluid from the valve chamber 25 to the outlet port 21b until the fluid pressure acting on the piston 52 reaches a predetermined value $P_1$, as described in detail later.

When supplying brake fluid into the braking system with the control device 20, bleed plugs (not shown) provided on the rear wheel brake cylinders 15 are released, and the master cylinder 10 is operated by repeated depression of the brake pedal 19. Brake fluid supplied into the rear pressure chamber 14 of master cylinder 10 is then delivered into the first fluid chamber $R_1$ of control device 20 through conduit 16 and inlet port 21a. The supplied fluid flows into the valve chamber 25 through first passage 23 and passage 43a and reaches the second fluid chamber $R_2$ through valve seat 42 and bypass passage 51. Thus, the brake fluid flows into the rear wheel brake cylinders 15 through outlet port 21b and conduit 17, finally to be drained out from the bleed plugs.

During the fluid delivery process as mentioned above, due to the tangential positioning of inlet port 21a at the upper wall of small diameter portion 22a, the brake fluid makes swirling movements within the first chamber $R_1$ so that the fluid proceeds to the first passage 23 entraining therewith the air existing within the first chamber $R_1$. The air with the fluid flows into the valve chamber 25 through first passage 23 and then passes through fluid passage 43a due to its self-buoyancy and the flow of fluid. Subsequently, this air combines with the air remaining in the upper portion of valve chamber 25 and flows into the second chamber $R_2$ through bypass passage 51 and second passage 24. The air then passes together with the fluid through outlet port 21b and conduit 17 to reach the rear wheel brake cylinders 15, finally to be drained out with the fluid from the bleed plugs. After the air-purging process is completed within the hydraulic circuit for the rear wheel brake cylinders 15, the bleed plugs are closed to effect the braking features as described hereinafter. It is also noted that during the above fluid delivery process the inertia-controlled ball 41 does not seat on the valve seat 42 because of bifurcation of the brake fluid into bypass passage 51 and second passage 24 through valve seat 42. Even if the ball 41 seats on the valve seat 42 by pressure of the brake fluid, the fluid will run through bypass passage 51 into second passage 24 to reliably drain out the air with the fluid.

Hereinafter the pressure controlling characteristics of the control device 20 will be described with reference to FIG. 2.

Under the unloaded condition of the vehicle, depression of the brake pedal 19 produces fluid pressure within the respective pressure chambers 11 and 14 of master cylinder 10. The pressure in front pressure chamber 11 is applied directly to the front wheel brake cylinders 13 through conduit 12, and the pressure in rear pressure chamber 14 is applied under the control of pressure control device 20 to the rear wheel brake cylinders 15 through conduits 16 and 17. Thus, the vehicle is braked in accordance with the value of the master cylinder pressure $P_M$ applied to the front and rear wheel brake cylinders 13 and 15.

In this braking operation, within the control device 20, the ball 41 does not move toward the valve seat 42, and the piston 52 acts to open the check valve 60 by engagement with the valve member 62 until the master cylinder pressure $P_M$ reaches the predetermined value $P_1$. During this initia stage, the master cylinder pressure applied to inlet port 21a is applied to the valve chamber 25 via first chamber $R_1$ and passages 23 and 43a. The pressure in valve chamber 25 is applied to the second fluid chamber $R_2$ through fluid chamber $R_0$, check valve 60 and second passage 24 in sequence, and further applied to the second fluid chamber $R_2$ through cut-off valve 40 and second passage 24. The pressure in second fluid chamber $R_2$ is then applied to the rear wheel brake cylinders 15 through outlet port 21b and conduit 17 to operate the rear wheel brakes. In this instance, the ball 41 will rest under gravity in the position owing to bifurcation of the fluid under pressure to maintain the initia distance between ball 41 and valve seat 42. On the other hand, the piston 52 starts to move against the resilient force of spring 54 in accordance with increase of the master cylinder pressure $P_M$.

When the master cylinder pressure $P_M$ reaches the value $P_1$, the piston 52 separates from the valve member 62 to close the check valve 60, and subsequently the rate of deceleration exceeds the predetermined value upon increasing of the master cylinder pressure up to a value $P_2$. Then, the ball 41 rolls forwardly toward the valve seat 42 due to the inertia force acting thereon to close the cut-off valve 40, which is indicated by a character A in FIG. 2. At this stage, a difference between pressures acting on pistons 30, 31 becomes substantially equal to the pre-load of spring 32 to remain the pistons 30, 31 in their positions. When the master cylinder pressure $P_M$ reaches a value $P_4$ after closing of the cut-off valve 40, the difference between pressures acting on pistons 30, 31 becomes substantially equal to the total of pre-loads of springs 32 and 33 to remain the pistons 30, 31 in their positions. As a result, the pistons 30, 31 do not move, the ball 41 is held on the valve seat 42 due to the inertia and the difference in pressure between first and second fluid chambers $R_1$ and $R_2$, and the valve member 62 is held on the valve seat 61 due to the biasing force of spring 63 and the difference in pressure between valve chamber 25 and second passage 24. Thus, the wheel cylinder pressure $P_W$ is controlled in a constant value as shown by a segment line A–B in FIG. 2.

Thereafter, due to further increase of the master cylinder pressure $P_M$, the fluid pressure acting on the small diameter piston 30 moves the large diameter piston 31 toward the second fluid chamber $R_2$ against the resilient force of springs 32 and 33. Then, the piston 31 acts on the fluid trapped in conduit 17 after closing of the cut-off valve 40 to increase the wheel cylinder pressure $P_W$, but owing to the difference between the effective pressure receiving areas of pistons 30 and 31 the rate of increase is less than the rate of increase in the master cylinder pressur $P_M$, which is indicated by a segment line B–C in FIG. 2. The control of the wheel cylinder pressure $P_W$ will continue until the piston 31 abuts against the inner wall of second fluid chamber $R_2$. After abutment with the inner wall of second chamber $R_2$, the wheel cylinder pressure $P_W$ will be maintained in a high value, as shown in FIG. 2.

Under the loaded condition of the vehicle, when the brake pedal 19 is depressed to apply the master cylinder pressure from the master cylinder 10 to the front and rear wheel brake cylinders 13 and 15 in the same process as described above, the large diameter piston 31 moves toward the first fluid chamber $R_1$ against the resilient force of spring 32 due to the difference between pressures acting on pistons 30 and 31, and the small diameter piston 30 is separated from the right hand retainer 37. At this initial stage, the increase of the master cylinder pressure up to the value $P_1$ causes retraction of the piston 52 to close the check valve 60. However, despite of increasing of the master cylinder pressure up to the value $P_2$, the rate of deceleration does not exceed the predetermined value because of larger inertia force acting on the vehicle.

Figure 2:
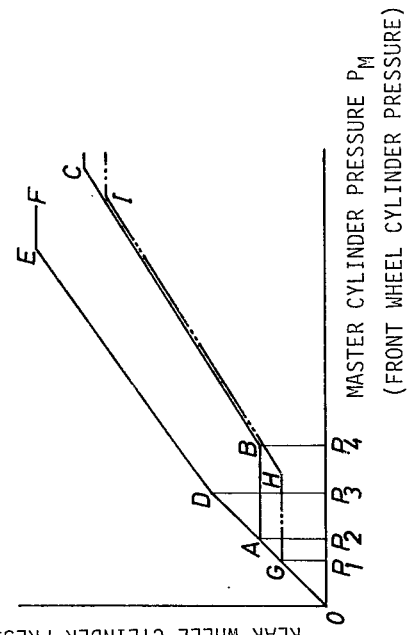
FIG. 2 is a graph indicating the pressure controlling characteristics of the control device.

When the master cylinder pressure $P_M$ reaches a high value $P_3$, the rate of deceleration exceeds the predetermined value, and in turn, the ball 41 rolls forwardly to close the cut-off valve 40 so that the fluid communication between first and second chambers $R_1$ and $R_2$ is blocked, which is indicated by a character D in FIG. 2. If the master cylinder pressure $P_M$ further increases by continued depression of the brake pedal 19, the large diameter piston 31 moves forwardly toward the second chamber $R_2$ due to the fluid pressure acting on the small diameter piston 30 and returing force of the spring 32. Thus, the large diameter piston 31 acts to gradually increase the wheel cylinder pressure $P_W$, as shown by a segment line D–E in FIG. 2. The increase of the wheel cylinder pressure $P_W$ will continue until the piston 30 abuts against the right hand retainer 37. After abutment with the retainer 37, the forward movement of piston 30 is restricted by the resilient force of spring 33 so that the wheel cylinder pressure is controlled in a constant high value, as shown by a segment line E–F in FIG. 2. Thereafter, due to further increase of the master cylinder pressure, the wheel cylinder pressure $P_W$ will be controlled substantially in the same process as described above under the unloaded condition of the vehicle. Thus, the desired accuracy in pressure control is always well maintained by the control device 20 regardless of the variations in static load on the wheels of the vehicle.

In actual practice of the present invention, the pressure controlling characteristics of the control device 20 is properly arranged by adjustments of the mounting angle of the housing assembly 21, the effective pressure receiving area of each piston, and the resilient force of each spring.

From the above detailed description, it will be understood that until the master cylinder pressure $P_M$ reaches the predetermined value $P_1$, the piston 52 acts to open the check valve 60 regardless of the variations in static load on the wheels of the vehicle. This means that even if the cut-off valve 40 is closed prior to increase of the master cylinder pressure up to the value $P_1$, the wheel cylinder pressure $P_W$ is controlled as shown by a characteristic line O–G–H–I in FIG. 2. In this instance, the character H indicates a stage where the pressures acting on pistons 30 and 31 are balanced to each other to movement of the pistons 30, 31 toward the second fluid chamber $R_2$, and the character I indicates a stage where the large diameter piston 31 abuts against the inner wall of second chamber $R_2$.

Although a certain specific embodiment of the present invention has been shown and described, it is obvious that many modifications and variations thereof are possible in light of these teachings. For example, the present invention may be adapted to an inertia-controlled valve unit in which the above-noted pistons 30 and 31 are eliminated. It is therefore to be understood that within the scope of the appended claims, the invention may be practiced otherwise than as specifically described herein.

What is claimed is:

1. A fluid pressure control device for incorporation in a vehicle braking system between a master cylinder and a wheel brake cylinder comprising:

a housing provided with an inlet port for connection to said master cylinder, an outlet port for connection to said wheel brake cylinder, and a valve chamber communicating at one end thereof with said inlet port and at the other end thereof with said outlet port;

inertia-controlled valve means including a first valve seat provided within said valve chamber to permit the flow of fluid between said inlet and outlet ports therethrough, and an inertia-controlled valve element housed within said valve chamber to co-operate with said first valve seat to cut off the flow of fluid from said inlet port to said outlet port when said valve element is subjected to deceleration in excess of a predetermined value;

a bypass passage to permit direct fluid flow from the upper part of said valve chamber into said outlet port;

check valve means including a second valve seat provided within said bypass passage, a valve member co-operating with said second valve seat to interrupt the direct flow of fluid from said valve chamber to said outlet port, and a first spring biasing said valve member toward said second valve seat to close said check valve means;

a piston axially slidable within a bore extending coaxially with said bypass passage and being exposed at an inner end thereof to pressure of the flow of fluid between said first valve seat and said outlet port, and a second spring biasing said piston toward said valve member, the resilient force of said second spring being larger than that of said first spring, and wherein said piston is engaged with said valve member to open said check valve means for allowing direct flow of fluid from said valve chamber to said outlet port until the pressure acting on said piston reaches a predetermined value, said piston being retracted by the pressure acting thereon against said second spring to close said check valve means prior to closing of said inertia-controlled valve means.

2. A fluid pressure control device as claimed in claim 1, wherein said second spring is engaged at one end thereof with said piston and received at an opposite end thereof by a screw plug threaded into said housing to bias said piston toward said valve member.

3. A fluid pressure control device as claimed in claims 1 or 2, wherein said piston is provided at the inner end thereof with a recess which receives therein a leg of said valve member.

4. A fluid pressure control device as claimed in claim 1, further comprising a differential piston slidably disposed within said housing in parallel with said valve chamber to form first and second fluid chambers communicating with said inlet and outlet ports respectively, said differential piston having a small end exposed in said first chamber and a larger end exposed in said second chamber, and a spring biasing said differential piston, in the axial direction thereof, toward the outlet port.

* * * * *